United States Patent [19]

Corbach et al.

[11] 4,445,059
[45] Apr. 24, 1984

[54] ELECTRIC MOTOR, IN PARTICULAR A SMALL MOTOR

[75] Inventors: Rainer Corbach, Lüdinghausen; Kurt Zimmermann, Bietigheim, both of Fed. Rep. of Germany

[73] Assignee: Robert Bosch GmbH, Stuttgart, Fed. Rep. of Germany

[21] Appl. No.: 387,877
[22] PCT Filed: Nov. 6, 1981
[86] PCT No.: PCT/DE81/00192
  § 371 Date: Jun. 7, 1982
  § 102(e) Date: Jun. 7, 1982
[87] PCT Pub. No.: WO82/02802
  PCT Pub. Date: Aug. 19, 1982

[30] Foreign Application Priority Data
  Feb. 3, 1981 [DE] Fed. Rep. of Germany ....... 3103475

[51] Int. Cl.³ ............................................. H02K 21/26
[52] U.S. Cl. ............................... 310/154; 310/40 MM
[58] Field of Search ................... 310/40 MM, 152, 154, 310/254, 258, 216, 218; 320/57

[56] References Cited
U.S. PATENT DOCUMENTS

| | | | |
|---|---|---|---|
| 2,048,161 | 7/1936 | Klaiber | 310/154 |
| 3,567,979 | 3/1971 | Jaffe | 310/154 |
| 3,594,599 | 7/1971 | West | 310/154 |
| 3,906,268 | 9/1975 | de Graffenried | 310/154 |
| 3,939,371 | 2/1976 | Murakami | 310/154 |
| 4,110,718 | 8/1978 | Odor | 310/154 |
| 4,112,320 | 9/1978 | Mohr | 310/154 |
| 4,237,397 | 12/1980 | Mohr | 310/154 |
| 4,383,193 | 5/1983 | Tomite | 310/154 |

FOREIGN PATENT DOCUMENTS

| | | | |
|---|---|---|---|
| 2205219 | 1/1972 | Fed. Rep. of Germany | 310/154 |
| 2226025 | 1/1973 | Fed. Rep. of Germany | 310/154 |
| 2527461 | 1/1977 | Fed. Rep. of Germany | 310/154 |
| 1167248 | 11/1958 | France | 310/154 |
| 2268377 | 11/1976 | France | 310/154 |

*Primary Examiner*—R. Skudy
*Attorney, Agent, or Firm*—Frishauf, Holtz, Goodman & Woodward

[57] ABSTRACT

Two-component, permanent field magnets are located opposite the armature and protrude beyond the armature core at both axial ends. The flux yield of the field magnets is improved in comparison with conventional two-component magnets by positioning a section (14) of highly coercive magnetic material (2) at the trailing edge, with an axial length only of substantially the axial length ($1_A$) of hte armature core, and placing protruding portions (16), protruding axially beyond ($1_M$) the armature core (10) of a highly remanent magnetic material (1).

3 Claims, 3 Drawing Figures

ELECTRIC MOTOR, IN PARTICULAR A SMALL MOTOR

The invention relates to a an electric motor, in particular a small motor, having at least two two-component field magnets opposite one another are facing an armature.

BACKGROUND

Two-component magnets have come into use in motors in response to requirements for the maximum possible magnetic flux on the one hand, and coercive field intensity in order to prevent demagnetization phenomena, on the other. It is not possible to satisfy both these requirements with a single magnetic material, because magnetic materials having high remanence have low coercive field intensity, and magnetic materials with a high coercive field intensity have low remanence. The danger of demagnetization of a magnet used in a motor is particularly great at the ends of the magnet, and is especially apparent when starting the motor at low temperatures and at the trailing edge. It has been proposed to use two-component magnets with highly coercive magnetic material at the trailing edge, and otherwise fabricating the magnet of a magnetic material having the greatest possible remanence. The material of maximum remanence has, however, lesser coercive field intensity in comparison with the highly coercive material.

The sections of the different materials are adjacent to one another in the circumferential direction of the motor; these sections of different magnetic material extend in the axial direction of the armature and protrude beyond the armature at either end by some distance. This axial magnetic overhang results in a further substantial increase in flux, i.e. 26%, given a magnet length 1.4 times the armature length, for example, and with a ratio of the armature diameter to the armature length of 1.83.

THE INVENTION

It is an object to provide an electric motor, and more particularly a permanent magnet field structure thefor, which, given the same dimensions as a motor, provides higher motor output or, with changed dimensions, and retaining a given power output, permits a saving in material.

Briefly, magnetic material of high coercive magnetic field strength is located at one or both circumferential end portions of the magnets, the remainder of the magnets being formed of highly remanent magnetic material. To increase the effective flux on the armature windings, the highly remanent magnetic material overlaps and extends axially beyond the projected outline of the core of the armature, even at the end portions where, in approximate alignment with the armature core, the highly coercive magnetic material is located.

The electric motor according to the invention, in particular a small motor, has the advantage that the permanent magnets arranged according to the invention deliver increased flux as compared to conventional two-component magnets, yet the resistance to demagnetization remains unchanged. Demagnetization at the trailing edge of the magnet—with respect to the rotational direction of the rotor—occurs only in the vicinity of the armature core. Demagnetization-resistant material is present, only where required, i.e. over the armature core. Thus, there is no sacrifice of demagnetization resistance. Because of the remaining parts of the magnet protruding beyond the ends of the armature, which are made of highly remanent magnetic material, the effective flux obtainable from the material of high remanence is increased while the overall geometry of the permanent magnets remains unchanged.

A motor whose permanent magnets are each 25×42 mm in size and whose armature core length is 30 mm, provides an increase of 2.8% in the magnetic flux, given a ratio between the two sections of different magnetic materials of 14/11, viewed in the circumferential direction. The increased flux yield with the geometry remaining unchanged also means higher power on the part of the motor; or, if the motor power remains constant, a saving in the weight of copper can be achieved. In the example mentioned above, the saving in copper, in a 12 V motor of 1.1 kW, is 5.2%.

DRAWING

The invention is shown in terms of an exemplary embodiment illustrated in the drawing and is explained in detail in the following description. Shown are:

FIG. 1, a longitudinal section of a small motor, in a schematic illustration;

FIG. 2, a top plan view of a permanent magnet of the small motor of FIG. 1;

FIG. 3, a schematic illustration of the demagnetization curves of the two magnetic materials contained in each permanent magnet as shown in FIGS. 1 and 2.

DETAILED DESCRIPTION

Figure 1:
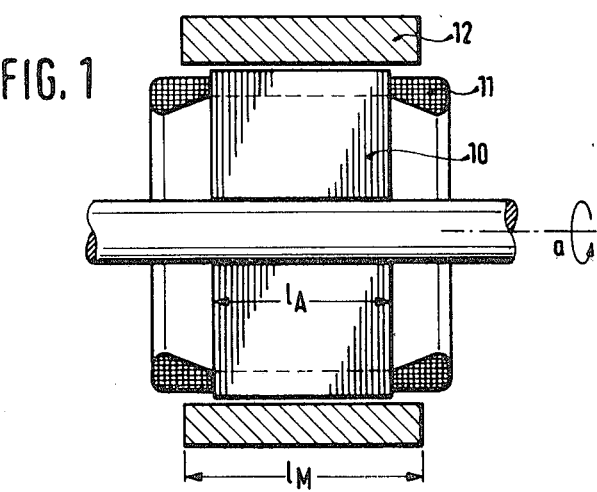

Only the elements essential to the understanding of the invention are shown in the motor of FIG. 1. The motor has an armature core 10, which, with winding 11, forms the rotor. The armature winding 11 is located in slots distributed about the circumference of the core, as well known. The armature 10 rotates in the direction indicated by arrow a of FIG. 1.

Two diametrically opposed permanent magnets 12 are located to face the armature 10, leaving an air gap. The magnets 12 protrude beyond the armature core 10 at either side in the axial direction of the armature—compare length arrows $l_A$ and $l_M$ in FIG. 1.

Figure 2:
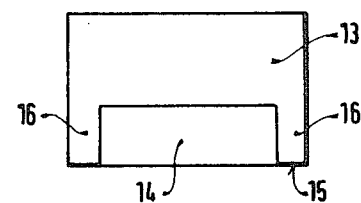

As may be seen in FIG. 2, each permanent magnet 12 has a first section 13 of highly remanent magnetic material extending in the axial direction and a second section 14 of a highly coercive magnetic material extending in the axial direction. The second section 14 is disposed on one end portion of the permanent magnet, viewed in the circumferential direction. Section 14 is located at that end which, with respect to rotational direction a of the rotor having the core 10, is the trailing edge 15 of the permanent field magnet 12.

Figure 3:
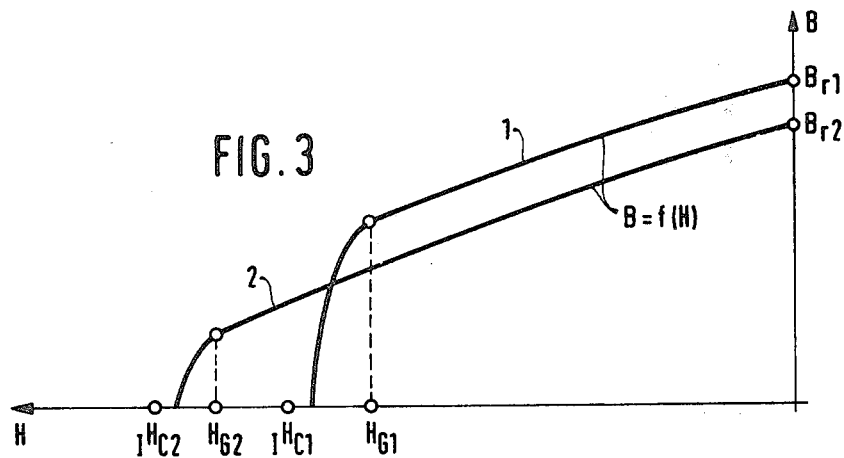

As may be seen in FIG. 3, the highly remanent magnetic material of section 13, indicated by the curve 1, has a greater remanence than the highly coercive magnetic material indicated by the curve 2 ($B_{r1} > B_{r2}$). However, the coercive field intensity of the highly coercive magnetic material, curve 2, is greater than the coercive field intensity of the highly remanent magnetic material, curve 1 ($_iH_{C1} < {_iH_{C2}}$), and thus the limiting field intensity $H_{G2}$ of the highly coercive magnetic material 2 is greater than the limiting field intensity $H_{G1}$ of the highly remanent magnetic material 1.

As seen in FIG. 2, the first section 13 of highly remanent magnetic material extends over the entire axial length $l_M$ of the permanent magnet 12, which protrudes to an equal extent beyond either end of the armature core 10. The second section 14 having the highly coercive magnetic material extends essentially only over the axis length $l_A$ of core 10. The two protruding portions 16 adjoining the second section 14, in the axial direction and protruding beyond the armature curve 10, like the first remaining portion of section 13 of the permanent magnet 12, have the highly remanent magnetic material of curve 1 of FIG. 3. Section 13 and portions 16 can be of unitary structure, surrounding section 14 in essentially U-shaped configuration. In other words, the second section 14, which extends exclusively over the armature length $l_A$ and having the highly coercive magnetic material of curve 2, is covered at both ends, in the vicinity of the protruding parts or portions 16, by the highly remanent magnetic material of curve 1 of the first section 13. The first section 13 surrounds, or envelops, the second section 14 at three sides.

In comparison with a convention two-component magnet of the same dimensions, in which the two protruding portions 16 are also of highly coercive magnetic material of curve 2, the two-conponent magnet 12 according to the invention has an increased flux yield while the demagnetization resistance remains unchanged. Given an armature core length $l_A=30$ mm, as overall magnet length $l_M=42$ mm and a magnet width of 25 mm, and given a ratio of the overall width of the first section 13 to that of the second section 14 of 14:11, the increase in the flux yield is 2.8%, as compared with a conventional two-component magnet having the same dimensions. This increase in the flux yield makes possible a corresponding increase in power, with other dimensions of the motor remaining unchanged. With constant power, on the other hand, this flux increase enables a saving of copper winding material in a motor of 1.1 kW of power at 12 V of 5.2%.

The invention is not restricted to the above-described exemplary embodiment. If the direction of motor rotation is reversible, then a second section of highly coercive magnetic material of curve 2, positioned in accordance with the invention, is disposed at both the outer circumferential ends of the permanent magnet 12, that is, referring to FIG. 2, at the top. Highly coercive material—curve 2 of FIG. 3—will thus be located at both circumferential ends of the magnet.

The embodiment of the permanent magnets 12 according to the invention can also be used in multiple-component magnets.

We claim:

1. In an electric motor, particularly a small motor, having
an armature including
an armature core (10) defining an axial length ($l_A$), and an armature winding (11) on the core,
a field magnet structure having
at least two permanent field magnets (12) facing the armature, the permanent magnets having an axial length ($l_M$) greater than the axial length of the armature core and protruding axially beyond the armature core at both ends;
each magnet including
at least a first section (13) of a highly remanent magnetic material (1) having a portion extending in axial direction over the armature core, and
at least one second section (14) of a highly coercive magnetic material (2) disposed at least at one circumferential end portion of the magnet,
wherein the highly remanent magnetic material (1) has a higher remanence in comparison to the highly coercive magnetic material (2), but a lower limiting coercive field strength,
wherein
the at least one second section (14) of highly coercive magnetic material (12) extends over essentially only the axial length ($l_A$) of the armature core (10);
the first section of highly remanent magnetic material includes
two protruding portions (16) adjoining the second section (14) at both axial ends of the second section, said protruding portions protruding beyond the axial dimension of the armature core (10); and said protruding poritons (16) of the first section (13) of highly remanent magnetic material are unitary with said portion extending in axial direction over the armature core (10).

2. Field magnet structure according to claim 1, wherein the protruding portions (16) of said first section (13) of highly remanent magnetic material surround the second section (14) of highly coercive magnetic material adjacent the axial ends of said armature core (10) to envelop said second section of highly coercive magnetic material, together with said portion of the highly remanent magnetic material extending in the axial direction over the armature, at three sides.

3. Field magnet structure according to claim 1, wherein said second section (14) of highly coercive magnetic material is surrounded at three sides in essentially U-shaped configuration by the portions of said first section (13) of said highly remanent magnetic material.

* * * * *